United States Patent
Grandinetti

[11] Patent Number: 6,135,140
[45] Date of Patent: Oct. 24, 2000

[54] STORM DRAIN DIVERTER

[76] Inventor: Frank J. Grandinetti, 627 S. Ellicott Creek Rd., Amherst, N.Y. 14228

[21] Appl. No.: 09/092,925

[22] Filed: Jun. 8, 1998

[51] Int. Cl.[7] .............................. E03F 1/00; F16K 51/00; F16L 29/00; E03B 7/07
[52] U.S. Cl. .......................... 137/362; 251/150; 137/559
[58] Field of Search ............................... 137/559; 138/90, 138/89; 251/150

[56] References Cited

U.S. PATENT DOCUMENTS

| | | | |
|---|---|---|---|
| 491,184 | 2/1893 | McCartney | 138/89 |
| 888,146 | 5/1908 | Deasy | 138/89 |
| 1,032,879 | 7/1912 | Carlton | 137/559 |
| 2,588,188 | 3/1952 | Weisman | 182/17 |
| 2,725,112 | 11/1955 | Weisman et al. | 137/362 |
| 3,667,640 | 6/1972 | Morrow | 138/89 |

FOREIGN PATENT DOCUMENTS

| | | | |
|---|---|---|---|
| 8704 | 4/1906 | United Kingdom | 138/90 |
| 17800 | 7/1910 | United Kingdom | 138/90 |
| 2161993A | 1/1986 | United Kingdom | 138/90 |

*Primary Examiner*—Denise L. Ferensic
*Assistant Examiner*—Ken Rinehart

[57] ABSTRACT

The invention comprises a diverter device which has an expandable perimeter for removably mounting same to a storm drain and comprises a passageway therethrough for the directing the controlled flow of air and/or fluids from the storm drain during a back-flow incident.

11 Claims, 2 Drawing Sheets

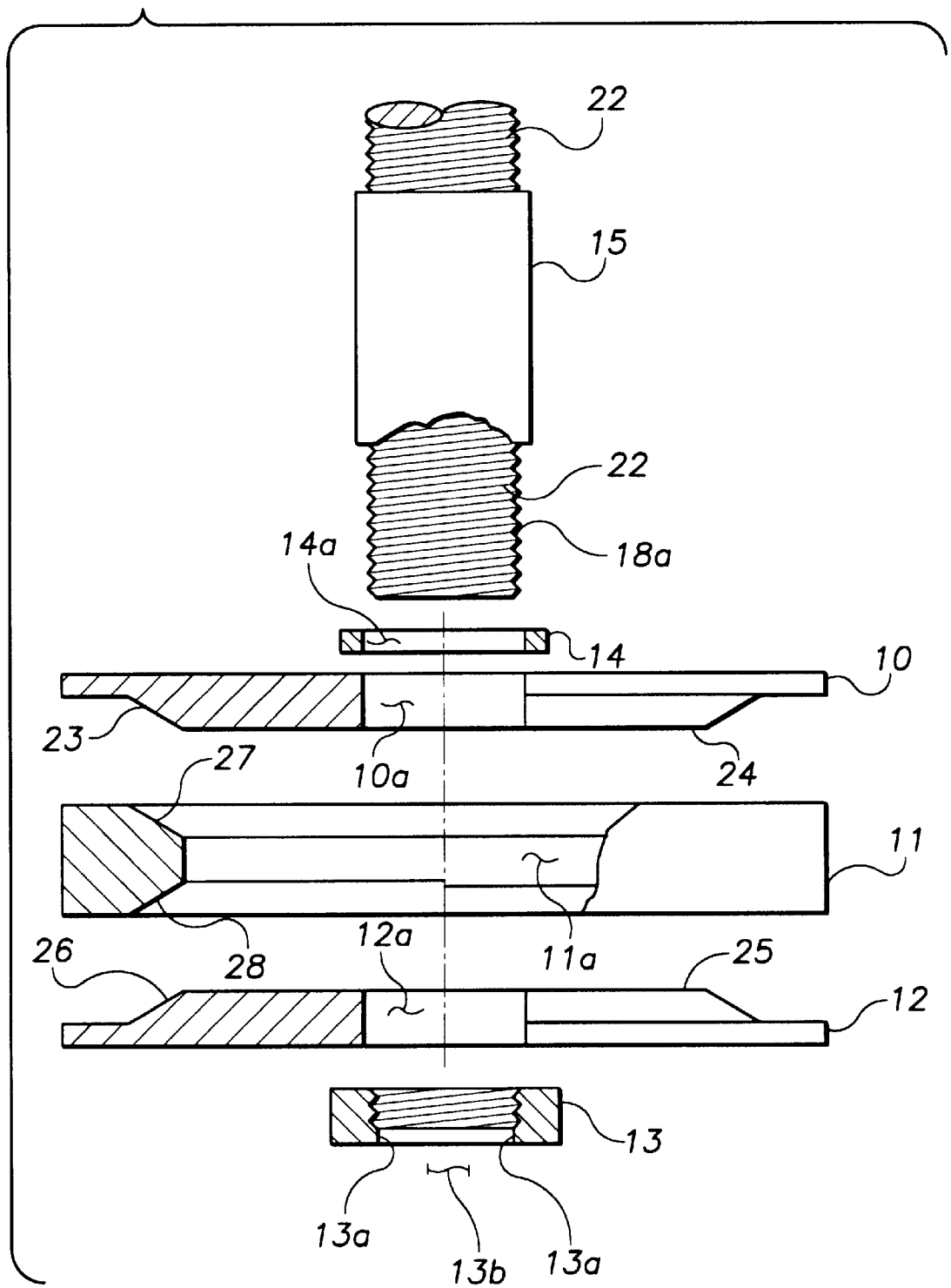

STORM DRAIN DIVERTER

This invention relates to a drain diverter device, which is particularly suitable for diverting and/or absorbing backflow from a pressurized storm drain overflow through a drain outlet.

BACKGROUND OF THE INVENTION

Storm water run-off systems are commonly found in many heavily populated geographic areas, generally functioning to distribute storm water run-off, accumulating in common areas such as streets and the like, through an underground system of typically publically owned conduits, to appropriate remote receiving basins. It is not uncommon for storm run-off is systems to be interconnected with various at and below ground level drains of buildings and the like along its path, into which roof drains, pavement drains or even floor drains are interconnected to efficiently disburse storm water and the like from private buildings, paved areas, property and the like. In many locations, it is common to find below ground cellars of buildings containing open floor drains which are interconnected to storm run-off systems to enable cleaning and excess water removal from a building.

A major problem with below and at ground level cellar floor drains and the like interconnecting with a storm run-off system is that typically buildings erected along such system are at different grade levels from each other and thus their floor drains are at different levels. Though the trunk conduits of storm run-off systems are generally graded to enable gravity flow of fluid through the system to a desired outlet, in the event of significant storming or even accidental plugging, it is not unusual that the system is taxed beyond its capacity wherein the fluids in the trunk conduits of the storm run-off system back-up into the feeder lines from buildings serviced along its route, and a positive overflow pressure is created at the ground level or below level floor drains, ending up in disastrous overflow flooding of basements and other property.

Because storm run-off systems do not generally carry human waste products, but are limited to storm overflow, most communities have not required one way valves in feeder lines to private properties interconnecting with the system and it is not unusual that many buildings interconnected with a storm run-off system have insufficient means to prevent the backflow of storm water through below ground level cellar floor drains. Because of the differences in grade, buildings along a storm water run-off system face different problems and different back-flow pressures when there is a capacity and/or plugging problem. Floor drains down grade from the backup level, can experience significant back flow pressure and it is not unusual that temporary drain plugs pop out when placed into an open drain to prevent back-flow, and even screw capped drains may be stressed to break or move and cause damage to the surrounding floor.

An object of the present invention is to provide a portable device which can be conveniently installed and/or removed from existing floor drains to prevent back-flow of storm run-off and/or sanitary water into undesired areas.

A further object of the invention is to provide a portable diverter device which can safely relieve the pressure of back-flow from a storm water run-off system.

This and other objects of the invention will become apparent in the following recitation of the invention.

SUMMARY OF THE INVENTION

The device of the present invention comprises an expandable plug, having a perimeter sized to removably mount into an opening of a drain and the like, and a passageway extending through the plug which comprises a conduit for the flow of storm water axially through the plug. The conduit is arranged to coact with the enablement of the expansion mechanism of the expandable plug, and generally comprises a valving means arranged to control the flow of fluid therethrough.

In a preferred embodiment, the expandable plug comprises first and second opposing rigid plates, each having an opening therethrough, and an elastomeric element which is arranged between the plates and has a passageway therethrough in alignment with opposing openings of the opposing plates. The elastomeric element is arranged to expand radially outwardly with movement of the plates toward each other, in an arrangement in which the perimeter of the elastomeric element expands to firmly engage an interior surface of a drain pipe or the like opening. The combination is arranged such that in a relaxed state the elastomeric element can be inserted into the drain pipe or the like opening and that upon compression of the plates toward each other, the perimeter of the elastomeric element expands to engage the interior diameter of the drain pipe opening and forms a plug which resists the passage of fluid around the perimeter of the expandable plug. The result is a removable plug which channels flow of fluid through the aligned openings of the rigid plates and elastomeric element.

A conduit is mounted through the opening of the first opposing plate and extends through the aligned openings of the elastomeric element and the second opposing plate to provide a discrete hollow passageway for flow of fluids through the plug. In a preferred embodiment an end of the conduit is mounted at the opening of the first opposing plate, the exterior surface of the conduit is threaded along at least a portion of its length and comprises a mating threaded nut which is arranged to engage the second opposing plate and upon tightening, draw the second plate toward the first opposing plate, axially compressing the elastomeric element therebetween and causing the perimeter of the elastomeric element to expand radially outward to engage an interior surface of the drain plug and form a seal at the perimeter of the plug and an interior surface of the drain. In a further preferred embodiment, the facing surfaces of the opposing plates comprise a shoulder beveled to a raised cylindrical surface. The elastomeric element comprises a continuous belt with beveled sides arranged to engage the beveled shoulders of the raised cylindrical surfaces. Upon movement of the opposing plates toward each other, the beveled sides of the belt engage the beveled shoulders of the raised surfaces, the elastomeric belt stretches and the raised surfaces force the belt radially outward to engage an inside surface of the drain pipe.

The conduit can be rigid or flexible and of any convenient length. Preferably it is at least in part rigid and comprises a valve means along its length. The function of the conduit can be generally three-fold. First, it can function as a stand pipe raising the gradient level at which overflow will occur when the run-off system is overburdened and enables convenient flow-back to the drain as flow is relieved to a lower system gradient. Second, it can function as a flow diverter when the overflow is a pressurized reverse flow from the run-off system to divert the back-flow to a desirable receiving point. Thirdly, it can function as an integral part of the means for compressing the elastomeric element and/or opposing plates of the assembly to engage its perimeter fixedly against an inner surface of the drain opening to form a seal.

In a preferred embodiment, the conduit has a rigid section which is interconnected with the plug and extends to a remote end several inches to several feet from the plug. Preferably the conduit comprising means at the extended end thereof to removably connect to piping and/or a flexible conduit, hose or the like. The conduit can be any convenient diameter. In one embodiment, the conduit is of a first diameter through the opening of the plug and greater diameter along its length extending from the plug, to provide an improved stand-pipe functionality. Generally it is preferred that the remote end of the conduit comprise a valve means for controlling fluid flow to/from the removably connected piping, conduit, hose or the like.

The valve means generally enables the device for convenient diverse functions including controlling the rate of fluid flow to/from the drain, and closing the drain opening to avoid accidental spills or annoying smells and the like which tend to occur when there is a back-flow of contaminated fluids. In a further preferred embodiment the valve means itself comprises means for removably mounting a flexible conduit or hose thereto which can be conveniently used to divert a flow of fluids to a suitable remote receiving area.

In a typical installation, the device is removably inserted into a below grade drain with the valve open and a flexible garden hose or the like connected and strung over a higher grade level to a below grade level remote receiving area, basin or the like. Upon backup of the storm run-off system, storm water rises in the conduit and hose depending upon the pressurized and/or non-pressurized nature of the backup with release though a hose outlet at the remote area.

In one embodiment, The conduit is enabled to view water level there-through by comprising a transparent viewing means or the like, and the valve means automatically functions to enable one way back-flow of fluid from the drain with sensing of back-up flow. In another the valve means is manually operable to enable hands-on monitoring of diversion. The valve arrangement is particularly useful as it enables convenient controlled flushing of the system, such as for example enabling the connection of a hose, piping or the like which can be connected to a pressurized water faucet or the like, the device installed in the drain and water flow from the pressurized faucet and/or pressurized air can be used to flush any blockage etc. from the feeder drain toward the main trunk of a storm and/or sanitary sewer system.

For a fuller understanding of the device of the present invention, reference should be made to the following detailed description taken in connection with the accompanying drawings.

BRIEF DESCRIPTION OF THE DRAWINGS

FIG. 2 is a partially exploded, partial sectional view of the expandable plug section of FIG. 1.

DETAILED DESCRIPTION OF THE DRAWINGS

Figure 1:
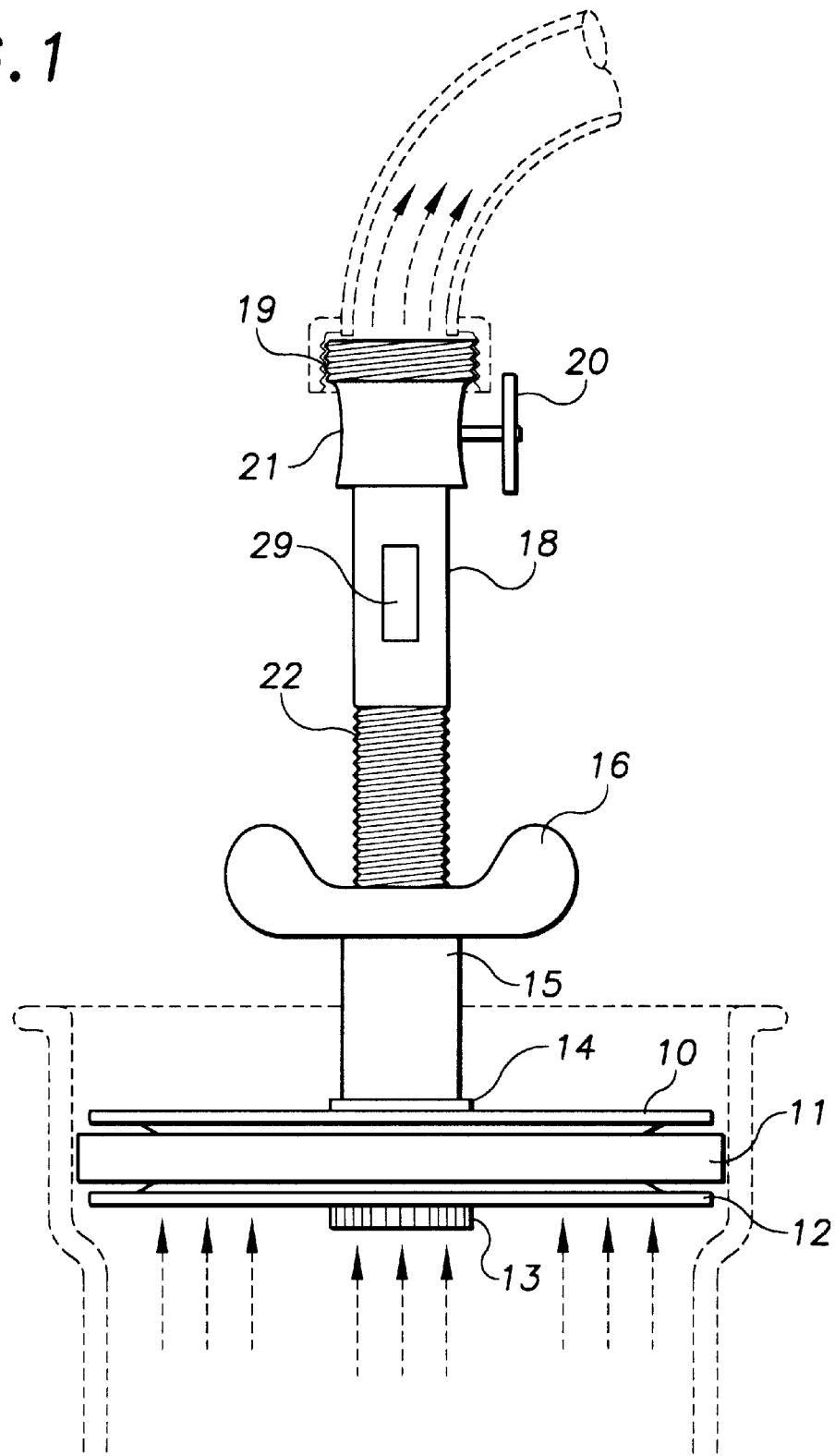
FIG. 1 is a front plan view of a storm drain diverter device of the invention.

Referring now to FIGS. 1–2, therein is illustrated a device of the invention wherein the expandable plug is illustrated as comprising first opposing plate 10, continuous elastomeric belt 11, second opposing plate 12, knurled conduit mounting nut 13, sealing washer 14 and spacer 15. Conduit 18 is illustrated as having a partially threaded outside surface 22 and comprising threaded wing nut 16, valve 21 and view glass 29. Valve 21 is illustrated as comprising open/close handle 20 and threaded end 19 which is sized to accept a standard garden hose coupling. Though the drawing depicts a male threaded end for accepting a mating female hose coupling end, it should be understood that it is contemplated the end can also be a female threaded end for accepting a threaded male end of a hose.

In the illustrated embodiment, conduit 18 is threaded 22, from a first end 18a to a point along its length sufficient to mount all the components comprising the expandable plug, including threaded wing nut 16, without significant compression of the components of the expansion plug, and particularly without significant stretching of expandable belt 11 from its relaxed configuration. End 18a inserts through the spacer 15 then through hole 14a of washer 14, hole 10a of first opposing plate 10, through the center opening 11a of continuous belt 11, then through hole 12a of second opposing plate 12 and into knurled mounting nut 13. Mounting nut 13 comprises a jam shoulder 13a which engages and locks against the tip of conduit 18, to prevent opposing plate 12 from moving axially off end 18a of conduit 18. Hole 13b through mounting nut 13 enables the flow of fluid into end 18a of conduit 18. The tightening of wing nut 16 downward against spacer 15, presses spacer 15 against sealing washer 14 and against opposing plate 10 which in turn presses downward against elastomeric belt 11 and downward against opposing plate 12.

As wing nut 16, tightens downward toward threaded end 18a of the conduit, beveled interior shoulder 27 of elastomeric belt 11 engages against beveled shoulder 23 of raised cylindrical facing surface 24 of opposing plate 10, and beveled interior shoulder 28 engages against beveled shoulder 26 of raised cylindrical facing surface 25 of opposing plate 12. As facing surfaces 24 and 25 are forced toward each other by tightening of wing nut 16, bevels 27 and 28 of the elastomeric belt are forced radially outward, with the exterior perimeter of belt 11 increasing to a greater diameter than in its relaxed state. Thus, the expandable plug is inserted into a circular opening of a drain in a relaxed state and wing nut 16 is tightened until the elastomeric belt firmly engages the interior surface of the circular opening to resist removal therefrom and form a seal with the inner surface of the drain.

It should be understood that various types of expandable plug can be used in the device of the present invention without departure from spirit of the invention. Thus, a pliable elastomeric element is preferred, but can be of various shapes and design, for example plugs comprising a gas filled elastomeric bladder and/or belt arrangements and/or generally solid elastomeric elements which are sufficiently pliable to radially expand when axially compressed. Similarly, a sealing element might comprise a beveled surface at its perimeter, which enables a greater range of application and/or can be forced into the drain opening to force a seal along its perimeter.

I claim:

1. A method for controlling the reverse flow of fluid upwardly through a gravity drain opening of an underground sewer system comprising:

providing a diverter means comprising a plug, having a radially expandable pliable element with a generally circular perimeter arranged between first and second opposing rigid plates, and an elongate generally rigid conduit mounted at a first end thereof to said first opposing plate of said plug and extending through said second opposing plate of said plug to form an open passageway through the plug about axial to said generally circular perimeter of the plug to a second end thereof having a flexible hose mounted thereto, said conduit having a threaded portion comprising a threaded nut means mounted thereto in an arrangement wherein threading said nut means along said threaded portion of said conduit moves said second opposing plate axially toward said first opposing plate enabling radial expansion of said pliable element;

arranging said plug means within a floor drain connected to an underground sewer system, and threading said threaded nut means sufficient to enable said pliable element to radially expand and grippingly seal a generally circular passageway from fluid flow around said plug means; and diverting fluid flowing upwardly from said underground sewer system toward an opening of said drain, through said conduit into said flexible hose mounted to said second end of said conduit.

2. The method of claim 1 wherein said pliable element comprises an elastomer.

3. The method of claim 1 wherein said first rigid plate is rotatably mounted to said first end of said conduit.

4. The method of claim 1 wherein a rigid plate comprises a circular perimeter.

5. The method of claim 1 wherein the pliable element comprises a continuous belt.

6. The method of claim 5 wherein a rigid plate comprises a shoulder beveled to a raised cylindrical surface, which is sized and dimensioned to engage a beveled surface of said continuous belt.

7. The method of claim 3 wherein said first end of said conduit is threaded.

8. The method of claim 1 wherein said threaded nut means arranged to thread axially along said conduit affects compression of an elastomeric element.

9. The method of claim 1 wherein said conduit comprises valve means.

10. The method of claim 9 wherein said valve means is arranged at about said second end of said conduit.

11. The method of claim 1 comprising means to view water level in said conduit.

* * * * *